Jan. 4, 1927.

W. F. SNOHR

STREET CAR BARN

Filed Oct. 6, 1924    2 Sheets-Sheet 1

1,613,332

Jan. 4, 1927.
W. F. SNOHR
1,613,332
STREET CAR BARN
Filed Oct. 6, 1924
2 Sheets-Sheet 2
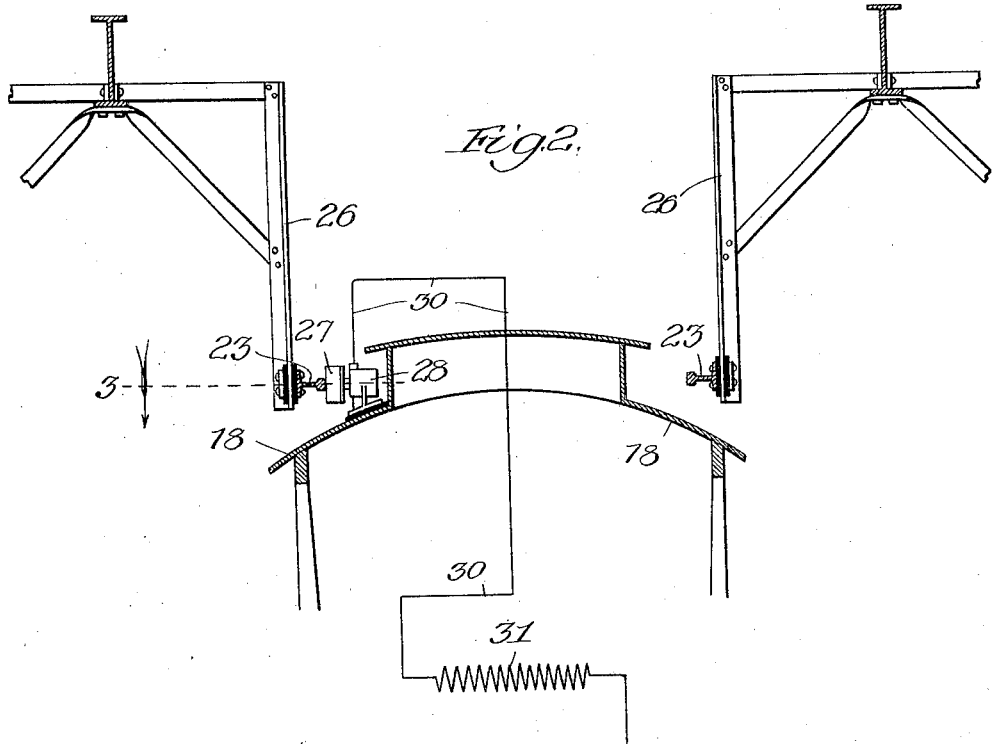
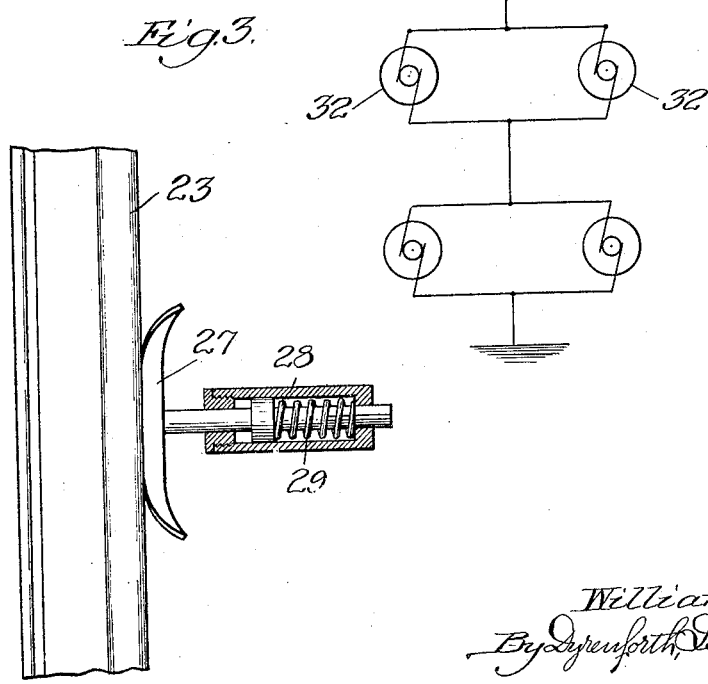
Inventor:
William F. Snohr,
By Dyrenforth, Lee, Chritton & Wiles,
Attys.

Patented Jan. 4, 1927.

1,613,332

UNITED STATES PATENT OFFICE.

WILLIAM F. SNOHR, OF CHICAGO, ILLINOIS.

STREET-CAR BARN.

Application filed October 6, 1924. Serial No. 741,900.

This invention relates to street car barns and the like.

The primary object of the invention is to provide a quick and efficient means for moving cars out of the barn in case of a fire and more particularly a means which can be controlled from a point outside of the barn as the presence of fire and smoke within the barn often makes it difficult to enter the barn and to remove cars therefrom.

These and other objects as will hereinafter appear are accomplished by the invention which is fully described in the following specification and shown in the accompanying drawings in which:

Fig. 2 is an enlarged section on line 2 of Fig. 1; and

Fig. 3 is an enlarged section on line 3 of Fig. 2.

Figure 1:
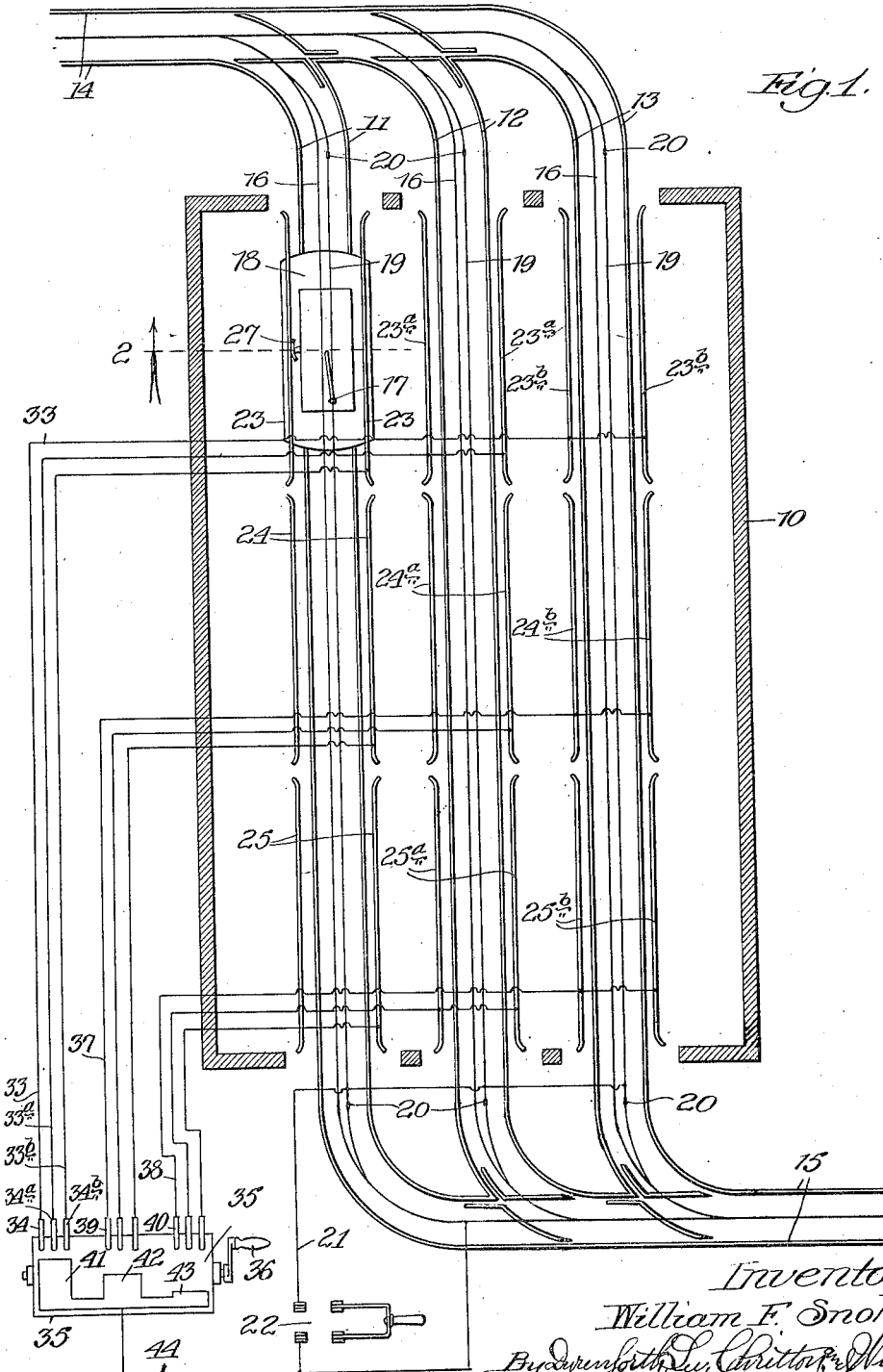
Figure 1 is a diagrammatic plan view of a car barn equipped with my invention.

This is an improvement on my Patent No. 1,449,202, granted March 20, 1923. The embodiment as illustrated comprises a street car barn 10 having a series of tracks 11, 12 and 13 which are shown as running into a single track 14 which lies outside of the car barn and preferably at right angles to the tracks 11, 12 and 13. If desired a similar track 15 may connect in a like manner with the opposite ends of the tracks within the car barn.

Overlying each track is a trolley wire 16 which is normally supplied with current at all times and on which the trolleys as 17 of the car 18 may travel in order to normally propel the cars into and out of the car barn.

"Dead" trolley wires 19 lying parallel to the live trolley wires 16 are insulated therefrom at 20 and having a lead 21 and switch 22 by means of which the dead trolley 19 may quickly be energized by closing the switch 22. Thus the cars normally enter the car barn with the trolley 17 on the live trolley wire 16, but before leaving the cars, the trolley 17 is switched to the dead trolley 19 as shown in Fig. 1 and the controller (not shown) of the car so arranged so that current will not flow therethrough even when the normal dead trolley wire 19 is energized.

The foregoing mechanism is described in detail in my prior patent and requires that even when the switch 22 is closed, thereby energizing the several trolley wires 19, an operator must manipulate the controller to take the car out of the barn.

In my present invention I have provided a series of rails 23, 24 and 25 which are preferably carried above the car 18 as shown in Fig. 2 upon a suitable frame-work 26 and are insulated therefrom. These rails are energized and controlled by means of a single controller as will be later described.

Each car is preferably equipped with a single shoe 27 which is mounted on the roof of the car in a housing 28 and has a spring 29 which normally presses it against the rail 23 as shown in Fig. 3. This shoe connects through a switch (not shown) on the car and through a lead 30, through the rheostat resistance 31 and thence to the motors 32 which are in series-parallel as shown in Fig. 2 which may correspond to the first or starting notch of the controller of the car.

Thus it will be seen that when the rails 23 are energized the cars 18 making contact with the rails 23, 23$^a$ and 23$^b$ will immediately begin to move forward very slowly as would be the case if the motorman were to turn the controller of each car to the first or starting notch under ordinary operation. In this connection it would be observed that after placing the car in the barn, the switch (not shown) which closes the lead 30 must be so thrown as to make it certain that the car 18 will move in the desired direction to take it out of the car barn when the rails 23, 23$^a$ and 23$^b$ are energized.

Referring now to Fig. 1, it will be observed that the rails are broken up into parallel series 23, 24 and 25 etc., the rails of each series extending across the car barn and being substantially the length of a car.

Each pair of rails of the series 23, 23$^a$ and 23$^b$ is connected by a lead 33, 33$^a$ and 33$^b$ with the insulated brushes 34, 34$^a$ and 34$^b$ which bear upon a controller cylinder 35, the latter being movable by means of a crank 36. In this way the accidental charging of one of the pairs of rails as by a bent trolley pole, will not cause others of the same series or of adjoining series to be charged. In the same way the series 24, 24$^a$ and 25$^a$ etc. are connected through leads 27, 27$^a$ and 38, 38$^a$ etc. with brushes 39, 29$^a$ and 40, 40$^a$ etc.

The controller cylinder 55 carries metal segments 41, 42 and 43 which are connected through a lead 44 with the live trolley wire 16 or a similar source of electric energy.

The segments 41, 42 and 43 are of varying lengths so that as the cylinder 35 is turned they are successively brought into contact with the brushes 34, 39 and 40. As a consequence, as the cylinder 33 is turned the segment 41 makes contact with the brushes 34, 34ª and 34ᵇ, thereby energizing all the rails of the series 23, 23ª and 23ᵇ. All of the cars 18 whose shoes 27 are in contact with the rails of this series, having been previously set with their motors in series-parallel circuit as shown in Fig. 2, are propelled out of the barn until these shoes run off the outer ends of the rail 23, 23ª etc. These rails can be extended further outside of the barn if desired, but in most barns a sharp curve occurs just outside of the car barn and it then becomes necessary for an operator to take each car separately out on the main line.

It will be noted that when the cars reach the entrance of the car barn with the shoes 25 off ends of the rails 23, the trolleys 17 will still be on the trolley wires 19 which are normally dead, to energize these trolley wires, the switch 22 is closed. Thus the safety of the car barn is maintained by having the trolleys 17 of the stored cars always resting on dead trolleys which for the purpose or convenience may be readily energized by throwing single switch 22.

When the first line of cars is removed from the car barn the controller cylinder 35 is turned so as to bring the segment 42 into contact with the brushes 39, 39ª etc. thereby energizing the series of rails 24, 24ª etc. and thus moving forward all the cars having shoes in contact with the rails 23 and 24, since both the segments 41 and 42 are under the brushes 34 and 39.

With the barn clear of this series of cars the controller cylinder 35 is further turned so as to bring the segment 43 under the brush 40. All of the rails 23, 24 and 25 are now energized and the next line of cars in the barn shown will then be moved forward to the entrance. While the shoes 27 are not long enough to bridge the gaps between the adjacent ends of rails 23, 24 etc., the inertia of the moving car will carry it across, or it will be moved by the car back of it.

Thus all of the cars can be moved forward to the entrance one series at a time, without any one being required to enter the barn, which in case of fire is often very difficult because of the heat and smoke.

While the rails 23, 24 etc., and apparatus connected therewith are sufficient for moving the cars to the openings of the car barn, it is still advisable to use also the dead trolley wires 19, although it will be apparent that the system as described may be operated without the latter if desired.

It will be understood that the rails and trolley wires described herein may be conductors of any desired cross section. Thus the trolley wire may be an inverted trough of metal such as a steel channel which will not readily melt in case of a fire and which will prevent the trolley from jumping off in the haste and confusion incident to a fire.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a street car barn and the like, a plurality of substantially parallel rows of tracks, a plurality of rails, each substantially parallel to one of said tracks and divided into a plurality of insulated sections longitudinally of the track, said sections being arranged in substantially parallel groups of rows across the tracks, and means for successively energizing predetermined groups of said sections for the purpose of moving said cars out of the barn in groups.

2. In a street car barn and the like, a plurality of tracks, a plurality of rails, each substantially parallel to one of said tracks and divided into a plurality of insulated sections longitudinally of the track, a controller having a series of contact fingers insulated from each other, a movable member having contact segments arranged to be brought successively into contact with a group of said contact fingers, a source of electric current connected to said contact segments, and a lead from each contact finger to a section whereby groups of said sections may be simultaneously energized for moving street cars located on said sections in groups out of the barn.

WILLIAM F. SNOHR.